(No Model.)
R. B. GRIFFIN.
KNEADER.
No. 602,398. Patented Apr. 12, 1898.
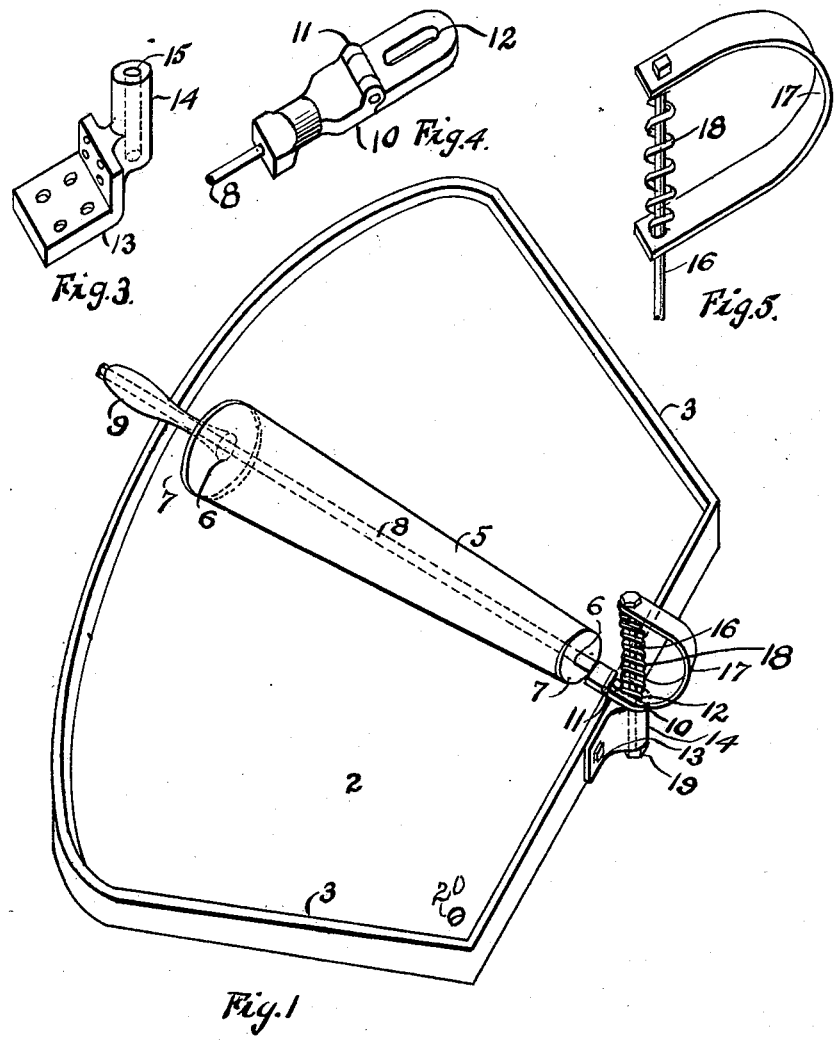
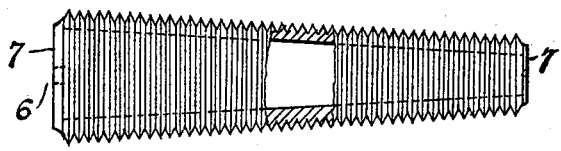
Witnesses.
W. Pierce Cowles
M. C. Gooley
Inventor
Russell B. Griffin
By Prado Hawley
his attorneys
THE NORRIS PETERS CO., PHOTO-LITHO., WASHINGTON, D. C.

UNITED STATES PATENT OFFICE.

RUSSELL B. GRIFFIN, OF MEXICO, MISSOURI, ASSIGNOR OF ONE-HALF TO CHARLES M. AMSDEN, LOUIS T. WATSON, AND HENRY P. WATSON, OF MINNEAPOLIS, MINNESOTA.

KNEADER.

SPECIFICATION forming part of Letters Patent No. 602,398, dated April 12, 1898.

Application filed July 16, 1897. Serial No. 644,749. (No model.)

*To all whom it may concern:*

Be it known that I, RUSSELL B. GRIFFIN, of Mexico, county of Audrain, State of Missouri, have invented a certain new and Improved Kneader, of which the following is a specification.

The object of this invention is to provide an improved device that may be used either for kneading and rolling dough or for working milk out of butter and that is also applicable for mashing or pulverizing cooked vegetables, sugar, salt, and many other articles.

The invention will be more readily understood by reference to the accompanying drawings, in which—

Figure 1 is a perspective view of a device constructed in accordance with my invention. Fig. 2 is a longitudinal section of the roll. Figs. 3, 4, and 5 are detailed perspective views showing the means for securing the end of the roll-support to the edge of the board.

In the accompanying drawings, 2 represents a suitable board or working surface of any preferred size and shape. It is provided with a raised ledge or binding 3, formed of wood or metal and projecting above the surface of the board to keep the article being worked upon the working surface of the board. This binding or rib also prevents warping or cracking of the board.

5 represents a suitable roller, made of wood and of any desired length and diameter. I prefer to employ a roller that tapers from one end to the other, as shown in Figs. 1 and 2 of the drawings. This roller is provided with a longitudinal opening 6, and a metallic plate 7, also provided with a central opening, is secured upon each end of the roller, as shown in Fig. 2 of the drawings, and these plates furnish the bearing for a rod 8, that extends through said roller. At its forward end the rod is provided with a suitable handle 9, and the roller turns freely upon said rod. The opposite end of the rod is connected to a jointed and slotted block 10. The two parts of this block are connected together by a rule-joint 11, which permits the forward end of the rod and the roller to be turned upward, but prevents the rod from turning beyond a certain point in the opposite direction. The block 10 is also provided with the longitudinal slot 12. Secured upon the edge of the board is a suitable bracket 13, provided with the post 14, having a substantially vertical opening 15 extending through it. The under side of the block 10 rests upon the top of the post 14, and the bolt 16, provided upon its upper portion with the U-shaped spring 17 and the coiled spring 18, passes through the slot 12 in the block 10 and then passes down through the opening in the post 14 and is provided at its lower end with a suitable nut 19, by means of which the position of the bolt and the tension of the springs may be adjusted.

The surfaces of the board and roller are preferably waxed or enameled with pure paraffin or a preparation consisting, preferably, of four parts of paraffin and one part of beeswax. This prevents the wet dough or butter from sticking to the surfaces of the board and roller and also prevents the milk and wet salt from soaking into the wood and makes the woodwork easy to rub clean without the use of hot water.

The springs resting on the slotted block to which the rear end of the rod is connected work up and down on the bolt as the hand operates the handle in pressing and rolling dough, butter, or other material. The rear end of the roller is held with a yielding pressure, which prevents any shock to the hand of the operator as the roll is passed over material placed upon the surface of the board. As the roller is pivotally mounted upon the bolt 16, it may be moved over substantially the entire surface of the board, and a large quantity of material may therefore be uniformly kneaded or worked by means of a very small machine. Dough, butter, cooked potatoes or other vegetables, sugar salt and other material may be rolled by this device, or fruits and berries may be placed in cloth or tinned-wire sacks and may be crushed or mashed by this device in order to be used in making jelly or jams. The board may be provided with one or more suitable drainage-openings 20, through which juices extracted may be drained off from the surface of the board. When the machine is used as a butter-worker, this opening will permit the escape of the buttermilk. While I prefer to use a board with a wooden surface and also a roller with a suitable wooden surface, I do not confine myself to the use of this material, as any other suitable material may, if preferred, be employed.

The slot in the block 10 may be made of any suitable length, and the block may be made of any length, so that by drawing the rod and roll toward or moving it from the operator the longitudinal position of the roll on the board may be varied, and by this means the roll may be brought down into the corners of the board, or a short roll may be used upon a board of considerable width and one that is considerably wider than the length of the roll.

The roll may have a plain smooth surface, as shown in Fig. 1, or it may be provided with ribs or corrugations extending around it, as shown in Fig. 2, and I may furnish with each machine two or more rolls of different kinds, and when it is desired to substitute one roll for another this may be readily done by removing the handle 9 from the end of the rod 8 and slipping the roll off over the end of the rod and substituting another therefor.

A corrugated roll formed of metal of the character shown in Fig. 2 of the drawings will be found useful for use in butchers' shops or other places for tendering meat, and in this instance, if preferred, the board may be provided with a metal surface either in the form of a plate adapted to be laid thereon or permanently fixed thereto.

Having thus described my invention, I claim as new and desire to secure by Letters Patent—

1. The combination, with a suitable board or working surface, of a rod, having a freely-turning roller arranged thereon and adapted to rest upon and be moved over said board or working surface, a suitable handle provided at one end of the rod, and a spring device pivotally connecting the other end of said rod to said board to permit the vertical movement of said rod and to relieve the jar upon the hand or arm of the operator, substantially as described.

2. The combination, with a suitable board or working surface, of a rod, a roller moved thereon, a suitable handle provided upon the outer end of said rod, a spring device pivotally connecting the inner end of said rod to said board and holding said rod thereon with a yielding pressure, while permitting vertical movement of the same, and means permitting the outer end of said rod to be swung upward away from the surface of said board, substantially as described.

3. The combination, with a suitable board, of the block 10 provided with the hinge 11 and the slot 12, the rod 8 secured upon said block, the freely-turning roll 5 mounted upon said rod, said block 10 being secured to said board by a suitable spring connection, for the purpose set forth.

4. The combination, with the board provided with the post 14, of the bolt 16 passing through said post, the rod 8 pivotally supported upon said bolt, a suitable spring arranged upon said bolt and holding said rod with a yielding pressure, and a suitable roll arranged upon said rod, for the purpose set forth.

5. The combination, with the board, provided with the post 14, the slotted and hinged block 10 resting upon the upper end of said post, the bolt 16 passing through said block and post and provided with the springs 17 and 18, bearing upon said block, the rod 8 secured to said block, and the roll 5 mounted upon said rod and adapted to turn freely thereon, for the purpose set forth.

In testimony whereof I have hereunto set my hand this 10th day of July, A. D. 1897.

RUSSELL B. GRIFFIN.

In presence of—
A. C. PAUL,
M. E. GOOLEY.